United States Patent
Kong et al.

(10) Patent No.: US 10,056,777 B2
(45) Date of Patent: Aug. 21, 2018

(54) VOLTAGE MODE DRIVER WITH CHARGE RECYCLING

(71) Applicant: QUALCOMM Incorporated, San Diego, CA (US)

(72) Inventors: Xiaohua Kong, San Diego, CA (US); Jie Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 150 days.

(21) Appl. No.: 15/192,911

(22) Filed: Jun. 24, 2016

(65) Prior Publication Data
US 2017/0373521 A1    Dec. 28, 2017

(51) Int. Cl.
| | |
|---|---|
| H03K 3/00 | (2006.01) |
| H03B 1/00 | (2006.01) |
| H02J 7/00 | (2006.01) |
| H02J 3/14 | (2006.01) |
| G05F 1/575 | (2006.01) |
| H04L 25/00 | (2006.01) |
| H04L 27/00 | (2006.01) |

(52) U.S. Cl.
CPC ............ *H02J 7/0072* (2013.01); *G05F 1/575* (2013.01); *H02J 3/14* (2013.01); *H04L 25/00* (2013.01); *H04L 27/00* (2013.01)

(58) Field of Classification Search
CPC ............................... H02J 7/0072; G05F 1/575
USPC .... 327/108–112, 427, 434, 437; 326/82, 83, 326/87
See application file for complete search history.

(56) References Cited

U.S. PATENT DOCUMENTS

| | | | |
|---|---|---|---|
| 5,347,492 A | 9/1994 | Horiguchi et al. | |
| 6,229,341 B1* | 5/2001 | Yamauchi | ........... H04L 25/0272 326/83 |
| 6,339,622 B1 | 1/2002 | Kim | |
| 7,768,324 B1 | 8/2010 | Limotyrakis | |
| 8,520,348 B2 | 8/2013 | Dong | |
| 8,847,633 B1 | 9/2014 | Kulkarni et al. | |
| 8,994,399 B2 | 3/2015 | Ali | |
| 9,207,695 B2 | 12/2015 | Friedman et al. | |
| 2006/0132179 A1* | 6/2006 | Kim | ......................... H04L 5/16 326/82 |
| 2008/0031379 A1 | 2/2008 | Feldtkeller | |
| 2011/0121802 A1* | 5/2011 | Zhu | ........................ G05F 1/575 323/281 |
| 2012/0086419 A1* | 4/2012 | Bai | .......................... H04R 1/04 323/280 |
| 2014/0176198 A1* | 6/2014 | Friedman | ........... H03K 19/0019 327/109 |
| 2014/0266327 A1* | 9/2014 | Ancis | ..................... H03K 3/012 327/112 |
| 2016/0086564 A1 | 3/2016 | Venkatesan et al. | |

FOREIGN PATENT DOCUMENTS

WO    WO-2013033622 A1    3/2013

OTHER PUBLICATIONS

International Search Report and Written Opinion—PCT/US2017/035525—ISA/EPO—dated Aug. 21, 2017.

* cited by examiner

*Primary Examiner* — Thomas Skibinski
(74) *Attorney, Agent, or Firm* — Haynes and Boone, LLP (57) ABSTRACT

A plurality of drivers for driving corresponding differential data output signals are arranged in series such that a first current discharged by a first one of the drivers is recycled through remaining ones of the drivers.

18 Claims, 7 Drawing Sheets

VOLTAGE MODE DRIVER WITH CHARGE RECYCLING

TECHNICAL FIELD

This application relates generally a transmitter, and more particularly to a voltage mode driver with charge recycling.

BACKGROUND

To save power, it is conventional to transmit data using a "low-swing" differential voltage signal. The signaling is deemed to be low swing in that the differential voltage is less than the power supply voltage. For example, the power supply voltage may be 1 V but the differential voltage for a low-swing differential voltage signal may be 300 mV or even lower such as 240 mV. Since the low-swing differential voltage signal is not driven "full rail" to the power supply voltage, power is conserved.

To provide the reduced voltage for a low-swing differential transmitter, it is conventional to use a low-drop-out (LDO) regulator. The LDO regulator acts as a resistor such that it introduces a power loss in converting the power supply voltage to the reduced voltage used for the low-swing differential signaling. This power loss gets repeated in that it is conventional to transmit a multi-bit-wide digital word using a corresponding plurality of low-swing differential signals. Each signal draws its own current from the LDO regulator that introduces its own corresponding power loss.

Accordingly, there is a need in the art for differential low-swing signaling with reduced power consumption.

SUMMARY

To provide reduced power consumption, a plurality of drivers for differential data output signals are coupled in series such that a current from a first one of the drivers is recycled through the remaining drivers. The first driver includes a pair of output nodes coupled to a plurality of transistors that act as switches to alternate a charging of the output nodes depending upon a binary state of a first differential data input signal. If the first differential data input signal has a first binary value, a first one of the output nodes is coupled to a power supply node supplying a power supply voltage whereas a remaining one of the output nodes is coupled to an intermediate voltage node charged by a power converter to an intermediate voltage that is less than the power supply voltage. If the first differential data input signal has a second binary value, the coupling is switched such that the first output node is coupled to the intermediate voltage node and the remaining output node is coupled to the power supply node.

The output nodes couple through transmission lines to a receiver to form a circuit such that the output node charged to the power supply voltage drives a first current through the receiver back to the output node charged to the intermediate voltage. This first current is then recycled through the remaining driver(s). For example, if there are just two drivers, the remaining second driver alternates the charging of its pair of output nodes between the intermediate voltage and ground. Just like the first driver, the second driver includes a plurality of transistors that function as switches in response to a second differential data input signal to selectively couple the second driver's output nodes to the intermediate voltage node and ground. The first current from the first driver is thus recycled as a second current in the second driver that is sourced from the output node coupled to the intermediate voltage node and conducted into ground by the remaining output node coupled to ground.

The resulting current recycling is quite advantageous with regard to saving power. These and additional advantages may be better appreciated through the following detailed description.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

To save power, a serial coupling is disclosed for a plurality of drivers for differential data output signals. A first driver couples between a power supply node supplying a power supply voltage and an intermediate voltage node. A voltage regulator such as a linear dropout regulator (LDO) charges the intermediate voltage node to an intermediate voltage that is less than the power supply voltage and greater than ground. The difference between the power supply voltage and the intermediate voltage thus represents the "voltage swing" for the first driver. In that regard, the first driver includes a pair of output nodes and a plurality of transistor switches. The transistor switches respond to a first differential data input signal. Depending upon the binary state of the first differential data input signal, the transistor switches are driven into a first configuration or into a second configuration. In the first configuration, the transistors switches are configured such that one of the output nodes couples to the power supply node such that the one output node is charged to the power supply voltage whereas a remaining one of the output nodes couples to the intermediate power node such that the remaining one of the output nodes is charged to the intermediate voltage. The second configuration is just the reverse such that the remaining one of the output nodes is charged to the power supply voltage whereas the first one of the output nodes is charged to the intermediate voltage.

The first driver's output nodes couple through respective transmission lines to a receiver such that the output nodes form a circuit through their respective transmission lines and the receiver. The output node charged to the power supply voltage will thus source a first current that flows through the receiver back to the output node charged to the intermediate voltage. The voltages for the output nodes and the corresponding direction of the first current define a first differential data output signal driven by the first driver. The first current from the first driver is recycled through the remaining drivers, which are coupled in series with the first driver. For example, in a system including just two drivers, the second driver couples between the intermediate voltage node and ground. The swing voltage for the second driver is thus defined by the difference between the intermediate voltage and ground. The second driver includes a plurality of transistor switches that respond to a binary state of a second differential data inputs signal to function analogously as discussed with regard to the first driver. A first output node for the second driver will thus be coupled to either the intermediate voltage node or to ground whereas a second output node for the second driver will be coupled in a complementary fashion. The resulting charging of one of the output nodes to the intermediate voltage causes the first current to be sourced from the charged output node through a corresponding receiver and be conducted into ground by the discharged one of the output nodes.

As noted earlier, an LDO charges the intermediate node that couples the two drivers together. This LDO has some input impedance that is much higher than the output impedance for the driver's output nodes. A negligible amount of current from the first driver will thus flow into the LDO such that it would be more accurate to indicate that the second driver conducts a second current from its output nodes that is substantially equal to the first current conducted by the output nodes of the first driver. But to a first order, the first current may be deemed to be entirely recycled by the second driver, which produces significant power savings. In that regard, it would be conventional to generate two differential data output signals using two corresponding drivers configured as discussed above for the second driver. In other words, each conventional driver would have a voltage swing between the intermediate voltage and ground. In such a conventional arrangement, the LDO must function as a resistor to the output current of its driver with regard to the voltage drop from the power supply voltage to the intermediate voltage. The resulting power consumption by the LDO is thus proportional to the driver output current. Each such conventional driver will thus have a power loss that is proportional to the current conducted by its output nodes. But the current recycling disclosed herein enables the two drivers to have the substantially the same power consumption as one conventional driver. The current recycling disclosed herein thus provides for the transmission of two differential data output signals at one half the power consumption of two corresponding conventional drivers.

Figure 1A:
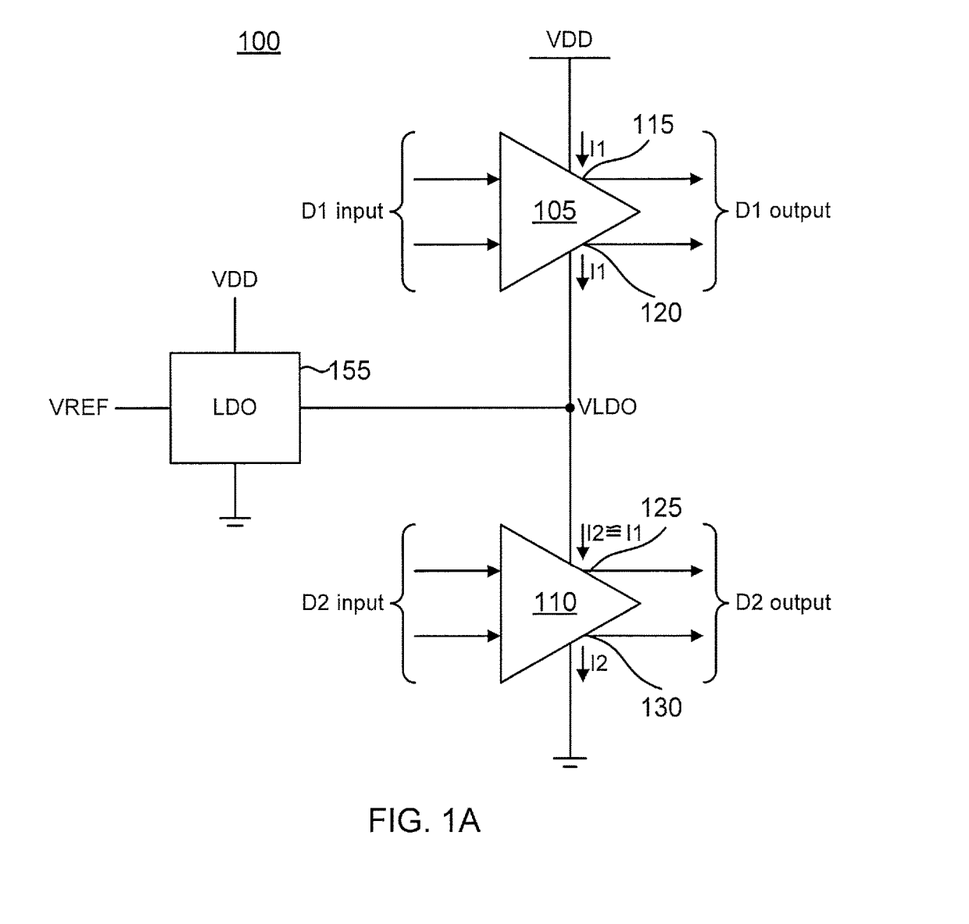
FIG. 1A is a diagram of a two-driver system configured for current recycling according to an aspect of the disclosure.

Even greater power savings may be obtained by the serial coupling of three (or more) drivers as will be explained further herein. The resulting advantageous features may be better appreciated through the following example embodiments. Turning now to the drawings, FIG. 1A illustrates a two-driver system 100. In system 100, a first driver 105 couples between a power supply node supplying a power supply voltage VDD and an intermediate voltage node VLDO. An LDO 155 powered by the power supply voltage VDD uses a voltage reference VREF to charge the intermediate voltage node VLDO to an intermediate voltage that is less than the power supply voltage VDD but greater than ground. It is beneficial if the magnitude of the voltage swing for first driver 105 to be the same as for a second driver 110 in which case the intermediate voltage would equal VDD/2 but it will be appreciated that other values may be used for the intermediate voltage. Depending upon the binary state of a first differential data input signal D1, first driver 105 will charge one of its output nodes 115 and 120 to the power supply voltage VDD and the other to the intermediate voltage. For example, suppose output node 115 is charged to the power supply voltage VDD while output node 120 is charged to the intermediate voltage VLDO in response to the first differential data input signal D1 having a first binary value. A first current I1 will then flow from the power supply node through output node 115 and through a remote receiver (not illustrated) and sink back in into output node 120 output node so as to be discharged into the intermediate voltage node VLDO. Conversely, if the differential data input signal D1 has a complementary second binary state, the charging of the output nodes is reversed such that output node 120 is charged to the power supply voltage VDD and output node 115 charged to the intermediate voltage. The first current I1 will then be sourced by output node 120 and returned through output node 115 to be discharged into the intermediate voltage node VLDO. The charging of the output nodes for first driver 105 and the resulting direction of the first current I1 defines the binary state of a differential data output signal D1 driven by first driver 105 to the receiver.

Second driver 110 is coupled between the intermediate voltage node VLDO and ground. Depending upon the binary state of a differential data input signal D2, second driver 110 will charge one of its output nodes 125 and 130 to the intermediate voltage and discharge a remaining one of its output nodes to ground. A second current I2 will then flow from the intermediate voltage node VLDO out through the charged output node for second driver 105 and be discharged to ground (after passing through the external receiver, not illustrated) upon returning to the discharged output node. Because of the high input impedance for LDO 155, the second current I2 is substantially equal to the first current I1 such that first current I1 is essentially recycled as second current I2.

In one aspect of the disclosure, first driver 105 may be deemed to form a first means for driving a first pair of output nodes 115 and 120 with a first differential current responsive to a first differential data input signal (D1), the first means being coupled between the power supply node and the intermediate voltage node VLDO. Similarly, second driver 110 may be deemed to form a second means for driving a second pair of output nodes 125 and 130 with a second differential current responsive to a second differential data input signal (D2), the second means being coupled between the intermediate voltage node VLDO and ground in series with the first means such that the second differential current substantially equals the first differential current.

Figure 1B:
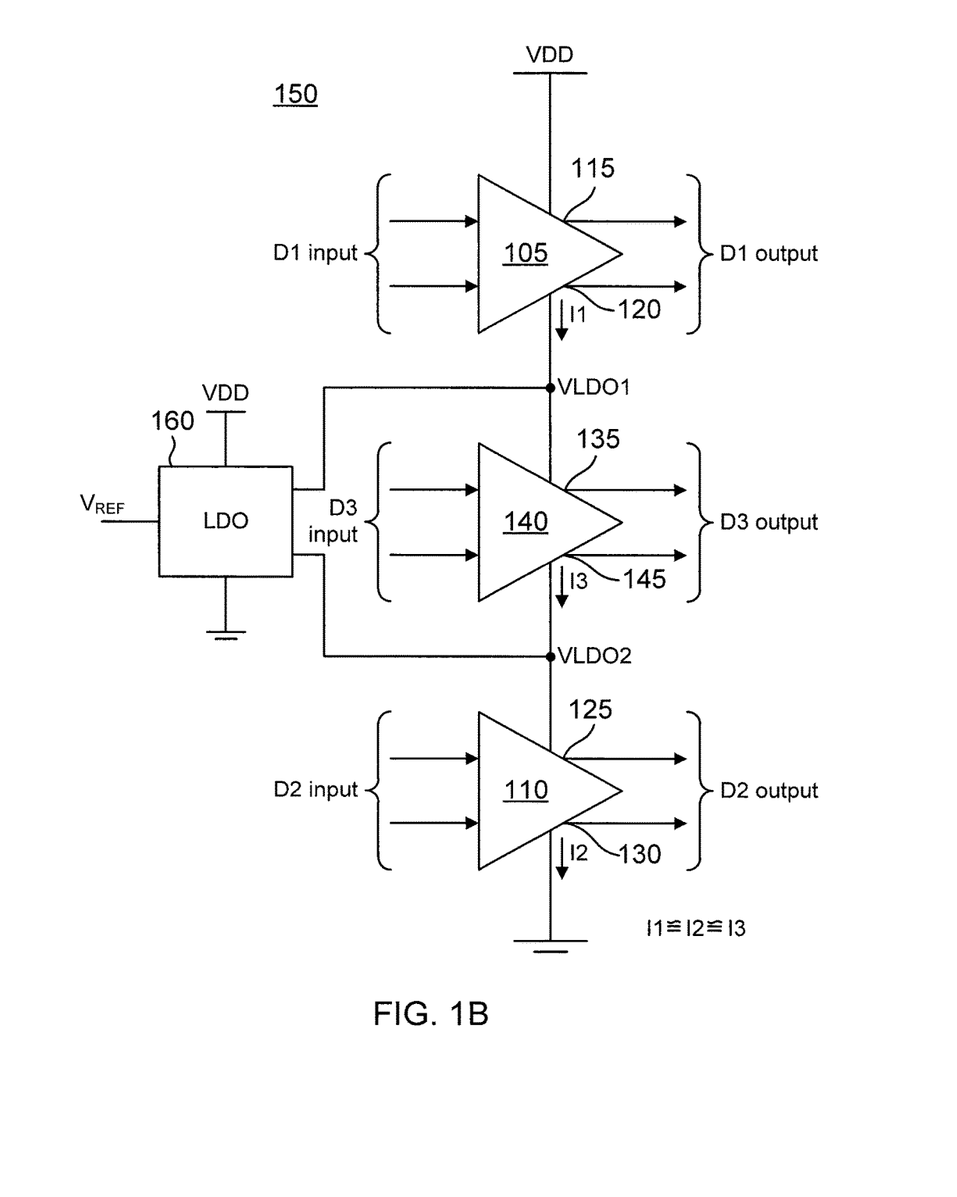
FIG. 1B is a diagram of a three-driver system configured for current recycling according to an aspect of the disclosure.

An analogous current recycling occurs in a three-driver system 150 shown in FIG. 1B. First driver 105 couples between the power supply node and an a first intermediate voltage node VLDO1 and responds to first differential data input signal D1 to drive first differential data output signal D1 as discussed analogously with regard to system 100. Similarly, second driver 110 couples between a second intermediate voltage node VLDO2 and responds to second differential data input signal D2 to drive second differential data output signal D2 as also discussed analogously with regard to system 100. However, first driver 105 is not directly in series with second driver 110. Instead, a third driver 140 intervenes between first driver 105 and second driver 110. Third driver 140 couples between the first intermediate voltage node VLDO1 and the second intermediate voltage node VLDO2 and responds to a third differential data input signal D3 to drive a third differential data output signal D3. A multiple-output LDO 160 charges the first intermediate voltage node VLDO1 to a first intermediate voltage VLDO1 and charges second intermediate voltage node VLDO2 to a second intermediate voltage VLDO2. The first intermediate voltage VLDO1 is less than the power supply voltage VDD and greater than the second intermediate voltage VLDO2, which in turn is greater than ground. As discussed with regard to system 100, it is beneficial if the swing voltage is equal for all three drivers in system 150. In such an embodiment, LDO 160 charges first intermediate voltage node VLDO1 to (⅔)*VDD and charges second intermediate voltage node VLDO2 to (⅓)*VDD. The swing voltage for drivers 105, 140, and 110 is thus (⅓)*VDD. But it will be appreciated that different swing voltages may be used in alternative embodiments.

Third driver 140 drives differential data output signal D3 using an output node 135 and an output node 145. Depending upon the binary value of differential data input signal D3, third driver 140 will charge one of output nodes 135 and 145 to the first intermediate voltage and a remaining one of the output nodes to the second intermediate voltage. A third current I3 will thus be sourced from the higher charged output node to be received at the output voltage with the lower voltage. Since multiple-output LDO 160 presents a high input impedance at first intermediate voltage node VLDO1 and at second intermediate voltage node VLDO2, third current I3 is substantially equal to both first current I1 and to second current I2. First current I1 is thus essentially recycled through both third driver 140 and second driver 110. In contrast, if three conventional drivers were each configured to have a voltage swing of (⅓)*VDD, such a conventional system would use three times the power used by system 150. Depending upon the sensitivity of the receiver, it will be appreciated that four or more drivers may be arranged in series in alternative embodiments to achieve even greater power savings.

Figure 2:
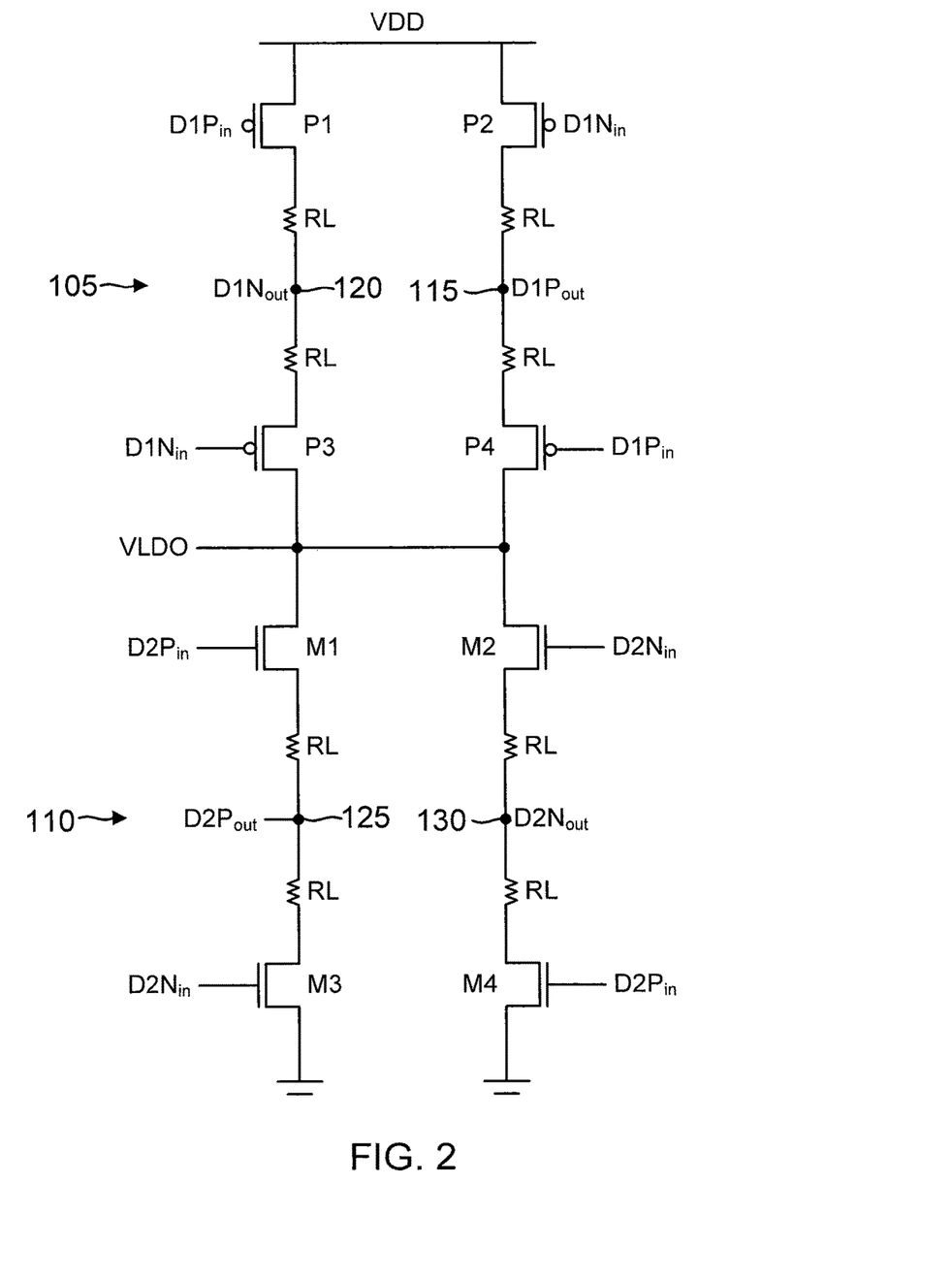
FIG. 2 is a circuit diagram for the two drivers of FIG. 1A.

The transistor switches in first output driver 105 and second output driver 110 in system 100 may be arranged as shown in FIG. 2. Since first driver 105 drives one of its output nodes to the power supply voltage VDD, the transistor switches in first driver 105 may all comprise PMOS transistors. In particular, first driver 105 includes a pair of PMOS transistors P1 and P2 both having their source coupled to a power supply node supplying the power supply voltage VDD. Since the input data signal D1 is differential, it is represented by a positive differential input data signal D1Pin and a negative differential input data signal D1Nin. Input signal D1Pin drives the gate of transistor P1 whereas input signal D1Nin drives the gate of transistor P2. The drains for transistors P1 and P2 each couple to a respective load resistor RL. In general, the resistance RL may match the characteristic impedance of the transmission line coupling an output node to the receiver (not illustrated). The drain of transistor P1 couples to an output node D1Nout 120 through its load resistor RL whereas the drain of transistor P2 couples to an output node D1Pout 115 through its load resistor RL. Output node D1Nout 120 couples through another load resistor RL to a source of a PMOS transistor P3. Similarly, output node D1Pout 115 couples through another load resistor RL to a source of a PMOS transistor P4. Input signal D1Pin drives the gate of transistor P4 whereas input signal D1Nin drives the gate of transistor P3. The drains for transistors P3 and P4 both couple to the intermediate voltage node VLDO.

If the differential data input signal D1Pin is sufficiently higher the differential data input signal D1Nin (e.g., higher by at least a threshold voltage for the PMOS transistors), transistors P2 and P3 will be conducting and transistors P1 and P4 will be off such that output node D1Pout 115 is charged towards the power supply voltage VDD while output node D1Nout 120 is charged towards the intermediate voltage VLDO. The first current I1 (FIG. 1A) will then be sourced by output node D1Pout 115 and received at output node D1Nout 120. Conversely, if the differential data input signal D1Nin is sufficiently higher in voltage than the differential data input signal D1Pin, transistors P1 and P4 will be conducting and transistors P2 and P3 will be off such that output node D1Nout 120 is charged towards the power supply voltage VDD while output node D1Pout 115 is charged toward the intermediate voltage VLDO. In that case, the first current I1 is sourced by output node D1Nout 120. In both cases (assuming that the load resistance RL is matched to the transmission line), the first current I1 equals Vswing/4*RL, where Vswing=(VDD−VLDO). For example, when output node D1Pout 115 is sourcing the first current I1, the load resistor RL at the drain of transistor P2 is in series with the load resistance RL for the transmission line on the way to the receiver. The first current I1 then returns from the receiver to output node D1Nout 120 such that the load resistance RL for the transmission line is in series with the load resistor RL at the source of transistor P3. The total resistance faced by the first driver current I1 is thus 4*RL.

Since second driver 110 discharges one of its output nodes towards ground, the transistor switches in second driver 110 may all comprise NMOS transistors. In particular, second driver 110 includes a pair of NMOS transistors M1 and M2 each having their drain coupled to the intermediate voltage node VLDO. Differential data input signal D2 is represented by a differential data input signal D2Pin and a differential data input signal D2Nin. The differential data input signal D2Pin drives the gate of transistor M1 whereas the differential data input signal D2Nin drives the gate of transistor M2. The source of transistor M1 couples through a load resistor RL to an output node D2Pout 125. Similarly, the source of transistor M2 couples through a load resistor RL to an output node D2Nout 130. Output node D2Pout 125 couples through another load resistor RL to the drain of an NMOS transistor M3 having its source coupled to ground. Output node D2Nout 130 couples through another load resistor RL to the drain of an NMOS transistor M4 having its source coupled to ground. Differential data input signal D2Pin drives the gate of transistor M4 whereas differential data input signal D2Nin drives the gate of transistor M3. Depending upon the binary state of differential data input signal D2, either transistors M1 and M4 will be conducting while transistors M2 and M3 are off or transistors M2 and M3 will be conducting while transistors M1 and M4 are off. One of output node 125 and 130 will thus be charged towards the first intermediate voltage VLDO while a remaining one of output nodes 125 and 130 will be discharged towards ground. The charged output node will then source the second driver current I2 (FIG. 1A) while the discharged output node receives the second driver current I2. Assuming that the load resistors RL are matched to the transmission line impedance, the second driver current I2 equals VLDO/4RL. If VLDO equals one half of the power supply voltage VDD, the first driver current I1 will be essentially equal to the second driver current I2 such that the first driver current I1 is recycled as the second driver current I2.

Figure 3:
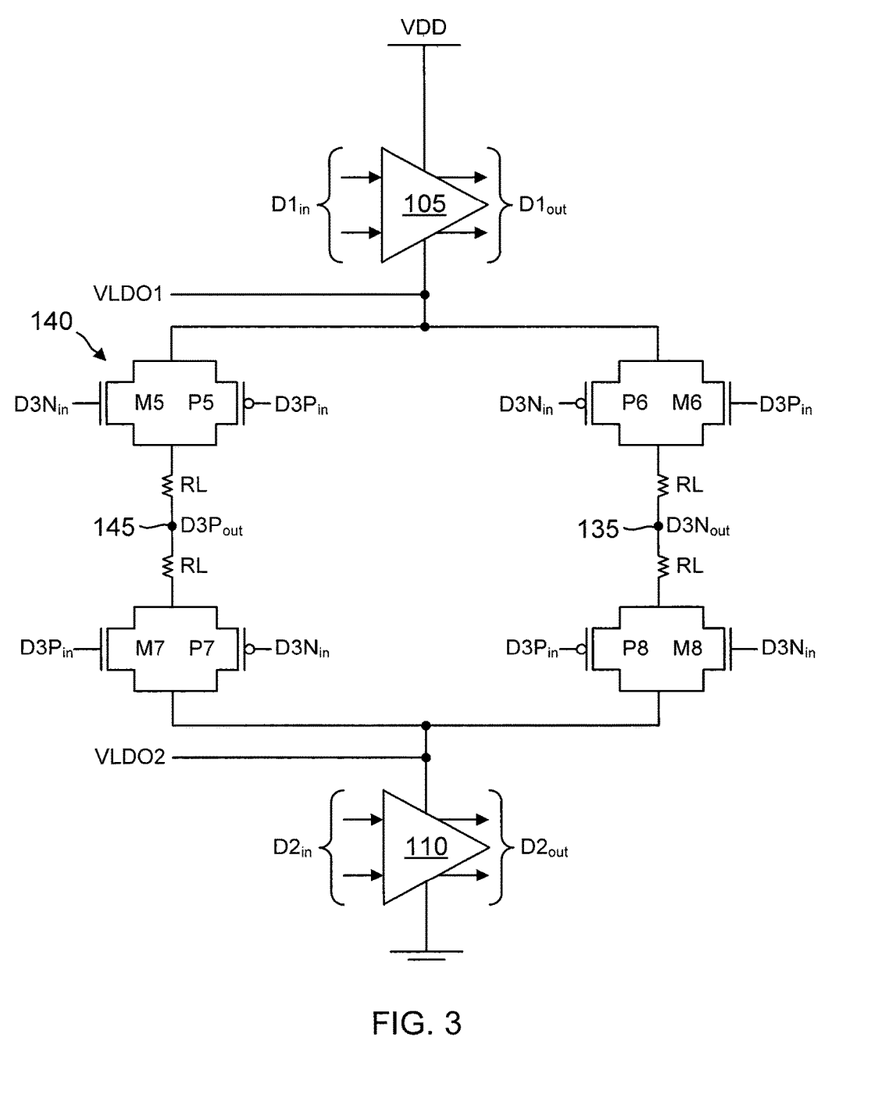
FIG. 3 is a circuit diagram for the middle driver of FIG. 1B.

System 150 is shown in more detail in FIG. 3. First driver 105 may be formed as discussed with regard to FIG. 2 except that the intermediate voltage node VLDO is replaced by the first intermediate voltage node VLDO1. Similarly, second driver 110 may be formed as discussed with regard to FIG. 2 except that the intermediate voltage node VLDO is replaced by the second intermediate voltage node VLDO2. In contrast to first output driver 105 and to second output driver 110, third output driver 140 does not drive its output nodes to the power supply voltage VDD nor to ground but instead to the intermediate voltages VLDO1 and VLDO2. The switches in third output driver 140 may thus be formed using transmission gates so as to adequately pass these two intermediate voltages. For example, third output driver 140 includes a first transmission gate formed by an NMOS transistor M5 and a PMOS transistor P5. The source of transistor P5 and the drain of transistor M5 both couple to the first intermediate voltage node VLDO1. The drain of transistor P5 and the source of transistor M5 couple through a load resistor RL to an output node D3Pout 145. Differential data input signal D3 is represented by a differential data input signal D3Pin and a differential data input signal D3Nin. The differential data input signal D3Pin drives the gate of transistor P5 whereas the differential data input signal D3Nin drives the gate of transistor M5. The first transmission gate will thus be closed when differential data input signal D3Nin is sufficiently higher in voltage than differential data input signal D3Pin. In that case, output node D3Pout 145 is charged towards the first intermediate voltage VLDO1 and sources the third driver current I3. Conversely, when the differential data input signal D3Pin is sufficiently higher in voltage than the differential data input signal D3Nin, the first transmission gate is opened closed.

Third output driver 140 include a second transmission gate formed by an NMOS transistor M6 and a PMOS transistor P6. The source of transistor P6 and the drain of transistor M6 both couple to the first intermediate voltage node VLDO1. The drain of transistor P6 and the source of transistor M6 couple through a load resistor RL to an output node D3Nout 135. The differential data input signal D3Pin drives the gate of transistor M6 whereas the differential data input signal D3Nin drives the gate of transistor P6. The second transmission gate will thus be closed when differential data input signal D3Pin is sufficiently higher in voltage than differential data input signal D3Nin. In that case, output node D3Nout 135 is charged towards the first intermediate voltage VLDO1 and sources the third driver current I3. Conversely, when the differential data input signal D3Nin is sufficiently higher in voltage than the differential data input signal D3Pin, the second transmission gate is opened.

Output node D3Pout 145 couples through another load resistor RL to a third transmission gate formed by an NMOS transistor M7 and a PMOS transistor P7. The source of transistor P7 and the drain of transistor M7 both couple through their load resistor RL to the output node D3Pout 145. The drain of transistor P7 and the source of transistor M7 couple to the second intermediate voltage node VLDO2. The differential data input signal D3Pin drives the gate of transistor M7 whereas the differential data input signal D3Nin drives the gate of transistor P7. In contrast to the first transmission gate, the third transmission gate will thus open when differential data input signal D3Nin is sufficiently higher in voltage than differential data input signal D3Pin.

Finally, output node D3Nout 135 couples through another load resistor RL to a fourth transmission gate formed by an NMOS transistor M8 and a PMOS transistor P8. The source of transistor P8 and the drain of transistor M8 both couple through their load resistor RL to the output node D3Nout 135. The drain of transistor P8 and the source of transistor M8 couple to the second intermediate voltage node VLDO2. The differential data input signal D3Nin drives the gate of transistor M8 whereas the differential data input signal D3Pin drives the gate of transistor P8. In contrast to the second transmission gate, the fourth transmission gate will thus be closed when differential data input signal D3Nin is sufficiently higher in voltage than differential data input signal D3Pin.

Figure 4A:
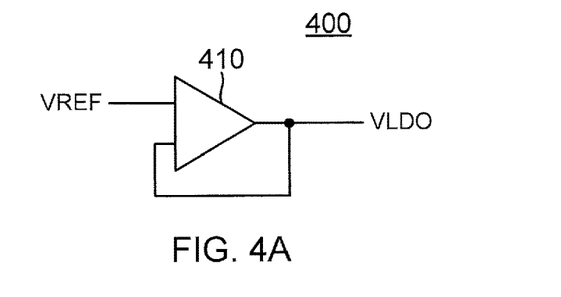
FIG. 4A is a circuit diagram of a linear drop out regulator (LDO) for the system of FIG. 1A in accordance with a first aspect of the disclosure.

Some example linear dropout regulators will now be discussed. For example, LDO 155 (FIG. 1A) may be implemented in a number of ways such as shown for an LDO 400 in FIG. 4A. A differential amplifier 410 amplifies the difference between the reference voltage Vref and the intermediate voltage VLDO to maintain the intermediate voltage VLDO equal to the reference voltage Vref. In LDO 400, a reference voltage source (not illustrated) would thus maintain the reference voltage Vref at VDD/2 to maintain the intermediate voltage VLDO at VDD/2 in one embodiment.

Figure 4B:
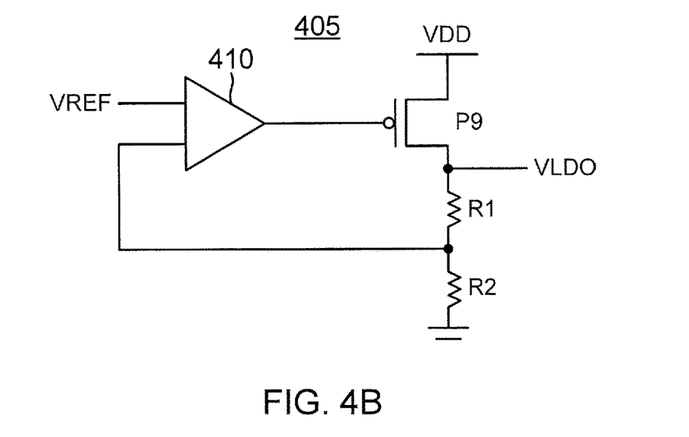
FIG. 4B is a circuit diagram of an LDO for the system of FIG. 1A in accordance with a second aspect of the disclosure.

Alternatively, LDO 155 may be implemented as shown for LDO 405 in FIG. 4B. A PMOS transistor P9 has its source coupled to the power supply voltage node for supplying the power supply voltage VDD. The drain of transistor P9 functions as the intermediate voltage output node VLDO, which in turn couples through a voltage divider formed by a serial combination of a resistor R1 and a resistor R2 to ground. The voltage divider forms a feedback voltage. Differential amplifier 410 amplifies the difference between the reference voltage Vref and the feedback voltage to drive the gate of transistor P9. If the resistance of resistor R1 equals the resistance of resistor R2 and if the reference voltage Vref is VDD/4, the intermediate output voltage VLDO will thus equal VDD/2.

Figure 4C:
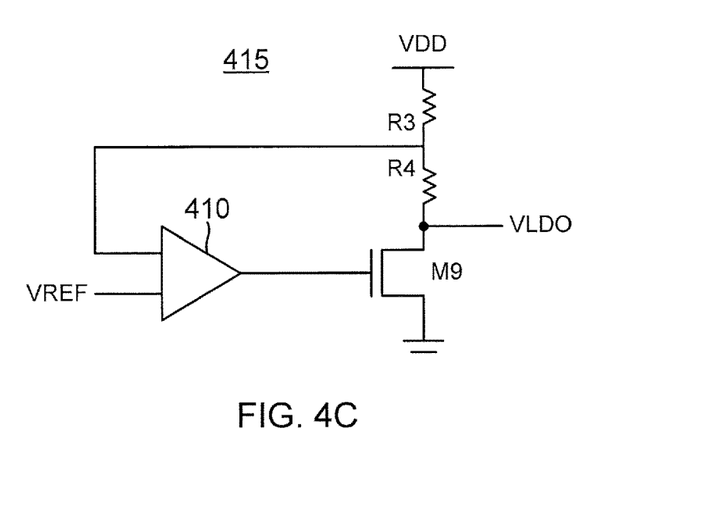
FIG. 4C is a circuit diagram of an LDO for the system of FIG. 1A in accordance with a third aspect of the disclosure.

In addition, LDO 155 may be implemented as shown for LDO 415 in FIG. 4C. An NMOS transistor M9 has its source coupled to the ground. The drain of transistor M9 functions as the intermediate voltage output node VLDO, which in turn couples through a voltage divider formed by a serial combination of a resistor R3 and a resistor R4 to the power supply voltage node. The voltage divider forms a feedback voltage. Differential amplifier 410 amplifies the difference between the reference voltage Vref and the feedback voltage to drive the gate of transistor M9. If the resistance of resistor R3 equals the resistance of resistor R4 and if the reference voltage Vref is (¾)*VDD, the intermediate output voltage VLDO will thus equal VDD/2.

Figure 5:
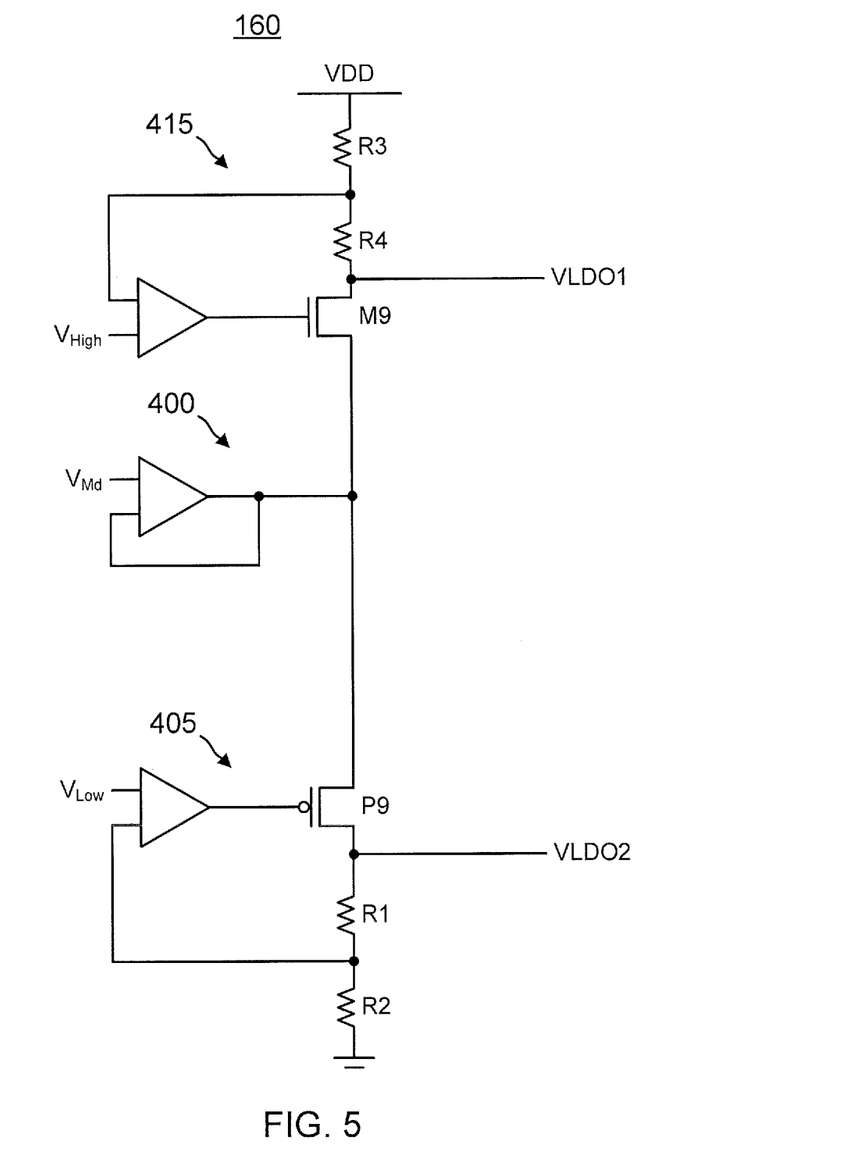
FIG. 5 is a circuit diagram of a multiple-output LDO for the system of FIG. 1B.

Multiple-output LDO 160 is shown in more detail in FIG. 5. LDO 415 is configured analogously as discussed with regard to FIG. 4C to produce the first intermediate voltage VLDO1. To maintain the first intermediate voltage at (⅔)*VDD, the reference voltage VHigh for LDO 415 may be maintained at (⅚)*VDD. Similarly, LDO 405 is configured analogously as discussed with regard to FIG. 4B to produce the second intermediate voltage VLDO2. To maintain the second intermediate voltage at (⅓)*VDD, the reference voltage VLow for LDO 405 may be maintained as (⅙)*VDD. The source of transistor M9 in LDO 415 couples to the source of transistor P9 in LDO 405. For additional stability, LDO 400 is configured to drive the sources of transistors M9 and P9 with a mid-range intermediate voltage such as equal to VDD/2. In that case, the reference voltage Vmd for LDO 400 would also be equal to VDD/2.

Regardless of the number of drivers in a given embodiment, note that the common-mode voltage for each corresponding differential data output signal is different. The receiver (not illustrated) may thus receive each differential data output signal through an AC coupling to filter out the different common-mode voltages. An example method of operation for current recycling in differential output drivers will now be discussed.

Figure 6:
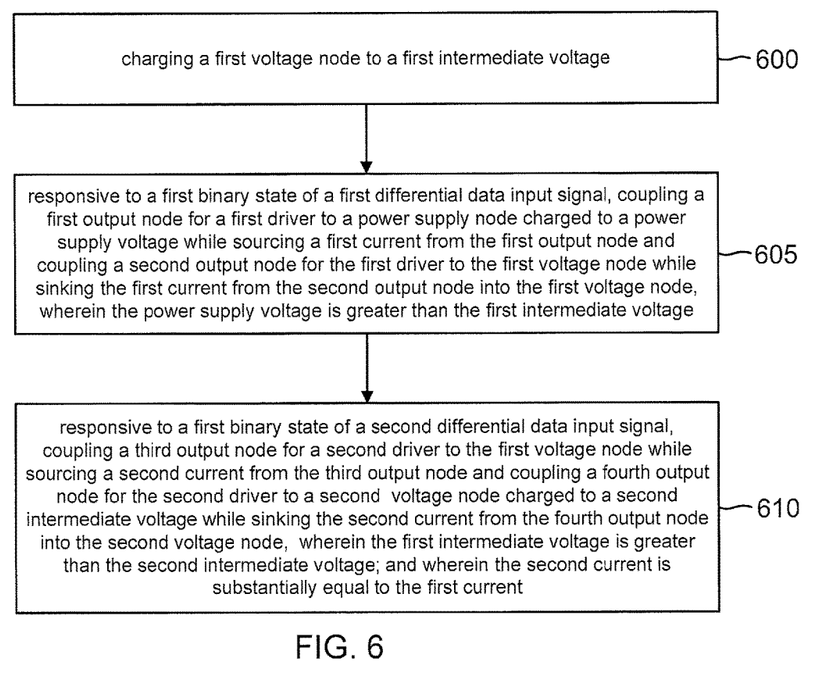
FIG. 6 is a flowchart for a method of current recycling between a pair of drives for differential data in accordance with an aspect of the disclosure.

An example method of operation for current recycling is provided by the flowchart of FIG. 6. The method includes an act 600 of charging a first voltage node to a first intermediate voltage. The charging of intermediate voltage node VLDO by LDO 400 in system 100 or the charging of the sources for transistors P9 and M9 by LDO 400 in system 150 is an example of act 600.

The method also includes an act 605 that is responsive to a first binary state of a first differential data input signal and includes coupling a first output node for a first driver to a power supply node charged to a power supply voltage while sourcing a first current from the first output node and coupling a second output node for the first driver to the first voltage node while sinking the first current from the second output node into the first voltage node, wherein the power supply voltage is greater than the first intermediate voltage. An example of act 605 in system 100 is the coupling of output node D1Pout 115 to the power supply node through transistor P2 in first driver 105 to source the first current from output node D1Pout 115 while coupling output node D1Nin 120 through transistor P3 to the intermediate voltage node VLDO to sink the first current into output node D1Nin 120. The same act is repeated by first driver 105 in system 150 except that the intermediate voltage node VLDO is replaced by the source nodes for transistors P9 and M9.

Finally, the method includes an act 610 that is responsive to a first binary state of a second differential data input signal and includes coupling a third output node for a second driver to the first voltage node while sourcing a second current from the third output node and coupling a fourth output node for the second driver to a second voltage node charged to a second intermediate voltage while sinking the second current from the fourth output node into the second voltage node, wherein the first intermediate voltage is greater than the second intermediate voltage; and wherein the second current is substantially equal to the first current. An example of act 610 in system 100 is the coupling of output node D2Pout 125 to the intermediate voltage node VLDO through transistor M1 in second driver 110 to source the second current from output node D2Pout 125 while coupling output node D2Nin 130 through transistor M4 to ground to sink the first current into output node D2Nin 130. In system 100, the second intermediate voltage of act 610 is thus ground. Another example of act 610 is in system 150 occurs when the first transmission gate (transistors M5 and P5) couples output node D3Pout 145 to the first intermediate voltage node VLDO1 to source the third current while the fourth transmission gate (transistors P8 and M8) couples output node D3Nout 135 to the second intermediate voltage node VLDO2 to sink the third current. The second intermediate voltage of act 610 in system 150 is thus VLDO.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A data transmitter, comprising:
a power supply node configured to supply a power supply voltage;
a multiple-output linear dropout power regulator (multiple-output LDO) configured to charge a first intermediate voltage node to a first intermediate voltage that is less than the power supply voltage and to charge a second intermediate voltage node to a second intermediate voltage that is less than the first intermediate voltage;
a first driver coupled between the power supply node and the first intermediate voltage node, the first driver configured to source a first current out of a first output node responsive to a first binary state of a first differential data input signal, the first driver being further configured to discharge the first current from a second output node into the first intermediate voltage node responsive to the first binary state of the first differential data input signal;
a second driver coupled between the first intermediate voltage node and the second intermediate voltage node, wherein the second driver is configured to substantially receive the first current from the first intermediate voltage node and to source the first current out of a third output node responsive to a first binary state of a second differential data input signal, the second driver being further configured to discharge the first current from a fourth output node into the second intermediate voltage node responsive to the first binary state of the second differential data input signal; and
a third driver coupled between the second intermediate voltage node and ground, wherein the third driver is configured to substantially receive the first current from the second intermediate voltage node and to source the first current out of a fifth output node responsive to a first binary state of a third differential data input signal, the third driver being further configured to discharge the first current from a sixth output node into ground responsive to the first binary state of the third differential data input signal.

2. The data transmitter of claim 1, wherein the first driver includes a first switch coupled between the first output node and the power supply node and includes a second switch coupled between the second output node and the first intermediate voltage node, and wherein the first switch and the second switch are both configured to close responsive to the first binary state of the first differential data input signal and configured to open responsive to a second binary state of the first differential data input signal.

3. The data transmitter of claim 2, wherein the first switch comprises a first PMOS transistor and wherein the second switch comprises a second PMOS transistor.

4. The data transmitter of claim 2, wherein the first driver further includes a first load resistor coupled between the first output node and the first switch and includes a second load resistor coupled between the second output node and the second switch.

5. The data transmitter of claim 2, wherein the first driver further includes a third switch coupled between the second output node and the power supply node and a fourth switch coupled between the first output node and the first intermediate voltage node, wherein the third switch and the fourth switch are both configured to close responsive to the second binary state of the first differential data input signal and to open responsive to the first binary state of the first differential data input signal.

6. The data transmitter of claim 5, wherein the third switch comprises a first PMOS transistor and wherein the fourth switch comprises a second PMOS transistor.

7. The data transmitter of claim 1, wherein the multiple-output LDO is configured to respond to a feedback voltage and to a reference voltage to maintain the first intermediate voltage equal to two-thirds of the power supply voltage.

8. The data transmitter of claim 7, wherein the multiple-output LDO comprises a differential amplifier configured to amplify a difference between the feedback voltage and the reference voltage to output the first intermediate voltage.

9. The data transmitter of claim 8, wherein the reference voltage equals five-sixths of the power supply voltage.

10. The data transmitter of claim 1, wherein the second driver comprises a plurality of transmission gates and wherein the third driver comprises a plurality of NMOS transistor switches.

11. The data transmitter of claim 10, wherein the multiple-output LDO comprises:
a first single-output LDO including a first differential amplifier configured to drive a gate of a first NMOS transistor to produce the first intermediate voltage at a drain of the first NMOS transistor,
a second single-output LDO including a second differential amplifier configured to drive a gate of a first PMOS transistor to produce the second intermediate voltage at a drain of the first PMOS transistor; and
a third single-output LDO configured to charge the source of the first NMOS transistor and the source of the first PMOS transistor to a third intermediate voltage that is greater than the second intermediate voltage and less than the first intermediate voltage.

12. The data transmitter of claim 11, wherein the third single-output LDO is configured to charge the source of the first PMOS transistor and the source of the first NMOS transistor to one-half the power supply voltage.

13. A data transmission method, comprising:
charging a first voltage node with a multiple-output linear dropout power regulator (multiple-output LDO) to a first intermediate voltage;
responsive to a first binary state of a first differential data input signal, coupling a first output node for a first driver to a power supply node charged to a power supply voltage while sourcing a first current from the first output node and coupling a second output node for the first driver to the first voltage node while sinking the first current from the second output node into the first voltage node, wherein the power supply voltage is greater than the first intermediate voltage;
charging a second voltage node with the multiple-output LDO to a second intermediate voltage, wherein the first intermediate voltage is greater than the second intermediate voltage, and wherein the second intermediate voltage is greater than ground;
responsive to a first binary state of a second differential data input signal, coupling a third output node for a second driver to the first voltage node while sourcing a second current from the third output node and coupling a fourth output node for the second driver to the a second voltage node while sinking the second current from the fourth output node into the second voltage node, wherein the second current is substantially equal to the first current; and responsive to a first binary state of a third differential data input signal, coupling a fifth output node for a third driver to the second voltage node while sourcing a third current from the fifth output node and coupling a sixth output node for the third driver to ground while sinking the third current from the sixth output node into ground, wherein the third current is substantially equal to the second current.

14. The data transmission method of claim 13, further comprising:
responsive to a second binary state of the first differential data input signal, coupling the second output node for the first driver to the power supply node while sourcing the first current from the second output node and coupling the first output node for the first driver to the first voltage node while sinking the first current from the first output node into the first voltage node; and
responsive to a second binary state of the second differential data input signal, coupling the fourth output node for the second driver to the first voltage node while sourcing the second current from the fourth output node and coupling the third output node for the second driver to the second voltage node while sinking the second current from the third output node into the second voltage node.

15. The data transmission method of claim 13, wherein charging the second voltage node to the second intermediate voltage comprises charging the second voltage node to one-third of the power supply voltage.

16. The data transmission method of claim 15, wherein charging the first voltage node to the first intermediate voltage comprises charging the first voltage node to two-thirds of the power supply voltage.

17. A data transmitter, comprising:
a power supply node configured to supply a power supply voltage;
a multiple-output linear dropout power regulator (multiple-output LDO) configured to charge a first voltage node to a first intermediate voltage that is less than the power supply voltage and to charge a second voltage node to a second intermediate voltage that is less than the first intermediate voltage and greater than ground;
a first means for driving a first pair of output nodes with a first differential current responsive to a first differential data input signal, the first means being coupled between the power supply node and the first voltage node;
a second means for driving a second pair of output nodes with a second differential current responsive to a second differential data input signal, the second means being coupled between the first voltage node and the second voltage node in series with the first means such that the second differential current substantially equals the first differential current; and
a third means for driving a third pair of output nodes with a third differential current responsive to a third differential data input signal, the third means being coupled between the second voltage node and ground in series with the second means such that the third differential current substantially equals the second differential current.

18. The data transmitter of claim 17, wherein the multiple-output LDO is configured to maintain the first intermediate voltage equal to two-thirds of the power supply voltage and to maintain the second intermediate voltage equal to one-third of the power supply voltage.

* * * * *